(12) United States Patent
Tajima

(10) Patent No.: US 11,171,380 B2
(45) Date of Patent: Nov. 9, 2021

(54) BINDING MEMBER, AND BATTERY MODULE

(71) Applicant: Panasonic Intellectual Property Management Co., Ltd., Osaka (JP)

(72) Inventor: Mitsutoshi Tajima, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 93 days.

(21) Appl. No.: 16/638,583

(22) PCT Filed: Sep. 11, 2018

(86) PCT No.: PCT/JP2018/033527
§ 371 (c)(1),
(2) Date: Feb. 12, 2020

(87) PCT Pub. No.: WO2019/065197
PCT Pub. Date: Apr. 4, 2019

(65) Prior Publication Data
US 2020/0220131 A1 Jul. 9, 2020

(30) Foreign Application Priority Data
Sep. 26, 2017 (JP) .............................. JP2017-184863

(51) Int. Cl.
*H01M 50/20* (2021.01)

(52) U.S. Cl.
CPC ........ *H01M 50/20* (2021.01); *H01M 2220/20* (2013.01)

(58) Field of Classification Search
None
See application file for complete search history.

(56) References Cited

FOREIGN PATENT DOCUMENTS

JP 2015-099648 5/2015

OTHER PUBLICATIONS

International Search Report of PCT application No. PCT/JP2018/033527 dated Nov. 27, 2018.

*Primary Examiner* — Wyatt P McConnell
(74) *Attorney, Agent, or Firm* — McDermott Will and Emery LLP

(57) ABSTRACT

A binding member includes a body part extending in stacking direction X of batteries, a supporting part extending in stacking direction X and projecting from the body part, the supporting part supporting a battery stack, and a plurality of pressing parts arranged to have a predetermined interval from the supporting part, the plurality of pressing parts being arranged in the stacking direction and projected from the body part to press the battery stack toward the supporting part. When the body part is divided into two regions that are a supporting part side region and a pressing part side region, a rigidity in the supporting part side region is smaller than a rigidity in the pressing part side region.

6 Claims, 4 Drawing Sheets

BINDING MEMBER, AND BATTERY MODULE

CROSS-REFERENCE TO RELATED APPLICATIONS

This application is a U.S. national stage application of the PCT International Application No. PCT/JP2018/033527 filed on Sep. 11, 2018, which claims the benefit of foreign priority of Japanese patent application 2017-184863 filed on Sep. 26, 2017, the contents all of which are incorporated herein by reference.

TECHNICAL FIELD

The present invention relates to a binding member and a battery module equipped with the binding member.

BACKGROUND ART

For example, there has been known a battery module having a structure in which a plurality of batteries are connected in series as a power source required to output a high voltage for, for example, a vehicle or the like. PTL 1 discloses a battery module. The battery module includes a battery stack including a plurality of batteries stacked and end plates sandwiching the plurality of batteries, and binding members that sandwich the battery stack and are fixed to the end plates.

CITATION LIST

Patent Literature

PTL 1: Unexamined Japanese Patent Publication No. 2015-99648

SUMMARY OF THE INVENTION

The inventor of the present invention has found that there is a room of improvement in stably holding a battery stack in a conventional binding member as a result of an intensive study for a binding member used for a conventional battery module. Stably holding a battery stack is important for stable operation of a battery module.

The present invention has been conceived in light of such circumstances, and an object thereof is to provide a technique to increase stability of a battery module.

An aspect of the present invention is a binding member. The binding member is for binding a battery stack including a plurality of batteries stacked and includes a body part extending in a stacking direction of the batteries, a supporting part extending in the stacking direction and projecting from the body part in a first direction in which the battery stack and the binding member are aligned, the supporting part supporting the battery stack, and a plurality of pressing parts arranged to have a predetermined interval from the supporting part in a second direction perpendicular to the stacking direction and the first direction, the plurality of pressing parts being arranged in the stacking direction and projected in the first direction from the body part to press the battery stack toward the supporting part. When the body part is divided into two regions in the second direction that are a supporting part side region and a pressing part side region, a rigidity in the supporting part side region is smaller than a rigidity in the pressing part side region.

The present invention enables to increase stability of a battery module.

DESCRIPTION OF EMBODIMENT

Figure 1:
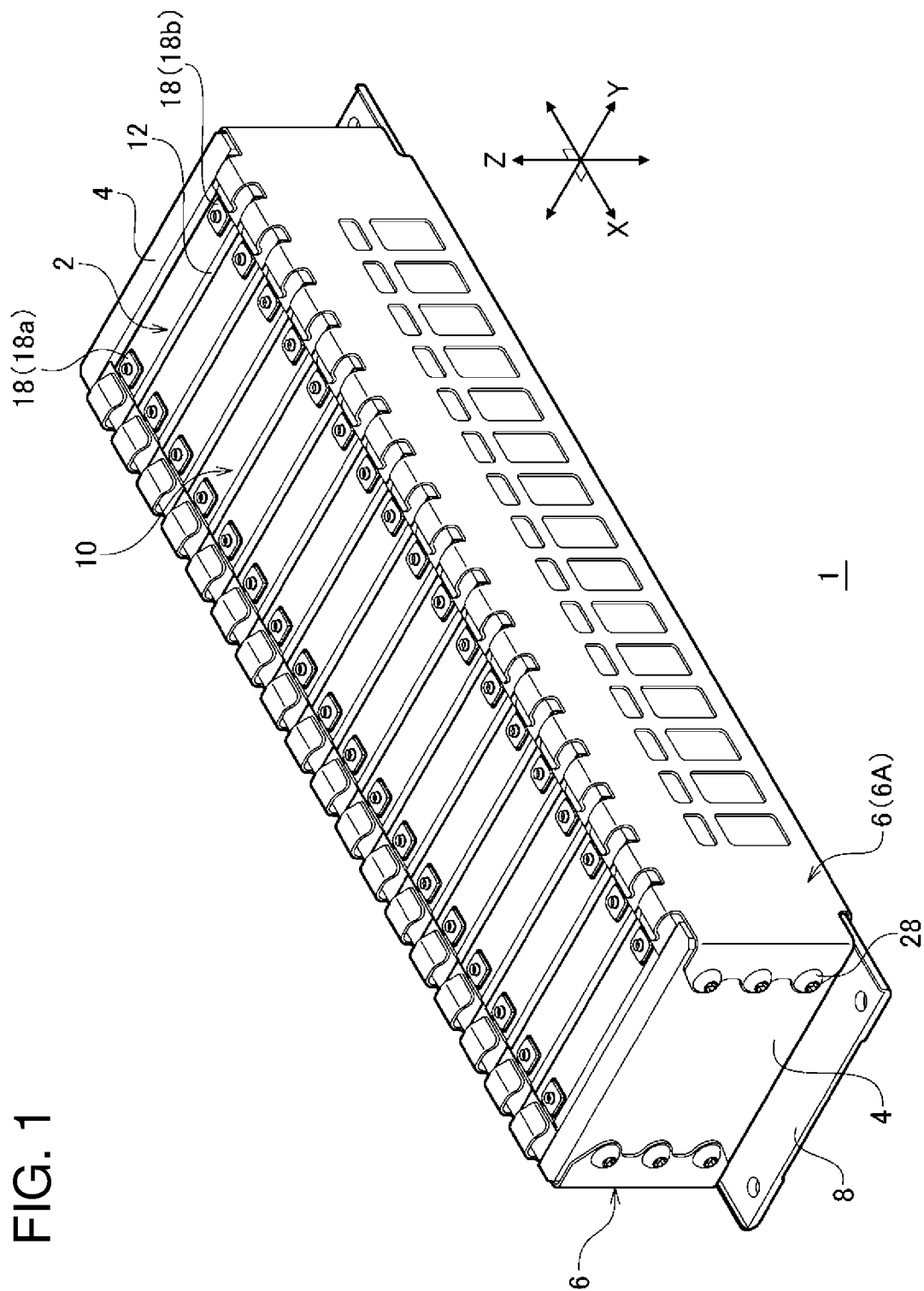
FIG. 1 is a perspective view illustrating a schematic structure of a battery module according to an exemplary embodiment.

Hereinafter, the present invention will be described with reference to the drawings on the basis of a preferred exemplary embodiment. The exemplary embodiment is an exemplification and does not limit the invention. All features described in the exemplary embodiment and combinations of the features are not necessarily essential to the invention. The same reference marks are assigned to the same or equivalent configuration elements, members, and processes illustrated in the drawings, and a duplicate description will be appropriately omitted. Further, scales or shapes of parts illustrated in the drawings are conveniently set for the sake of easy understanding, and should not be interpreted as limitation unless particularly mentioned. In some cases, even the same members may slightly differ in scale or the like between the drawings. Terms "first", "second", and the like, when used in the present description or claims, do not mean any order or importance unless particularly mentioned, and are used for distinguish between one configuration and another configuration.

Figure 2:
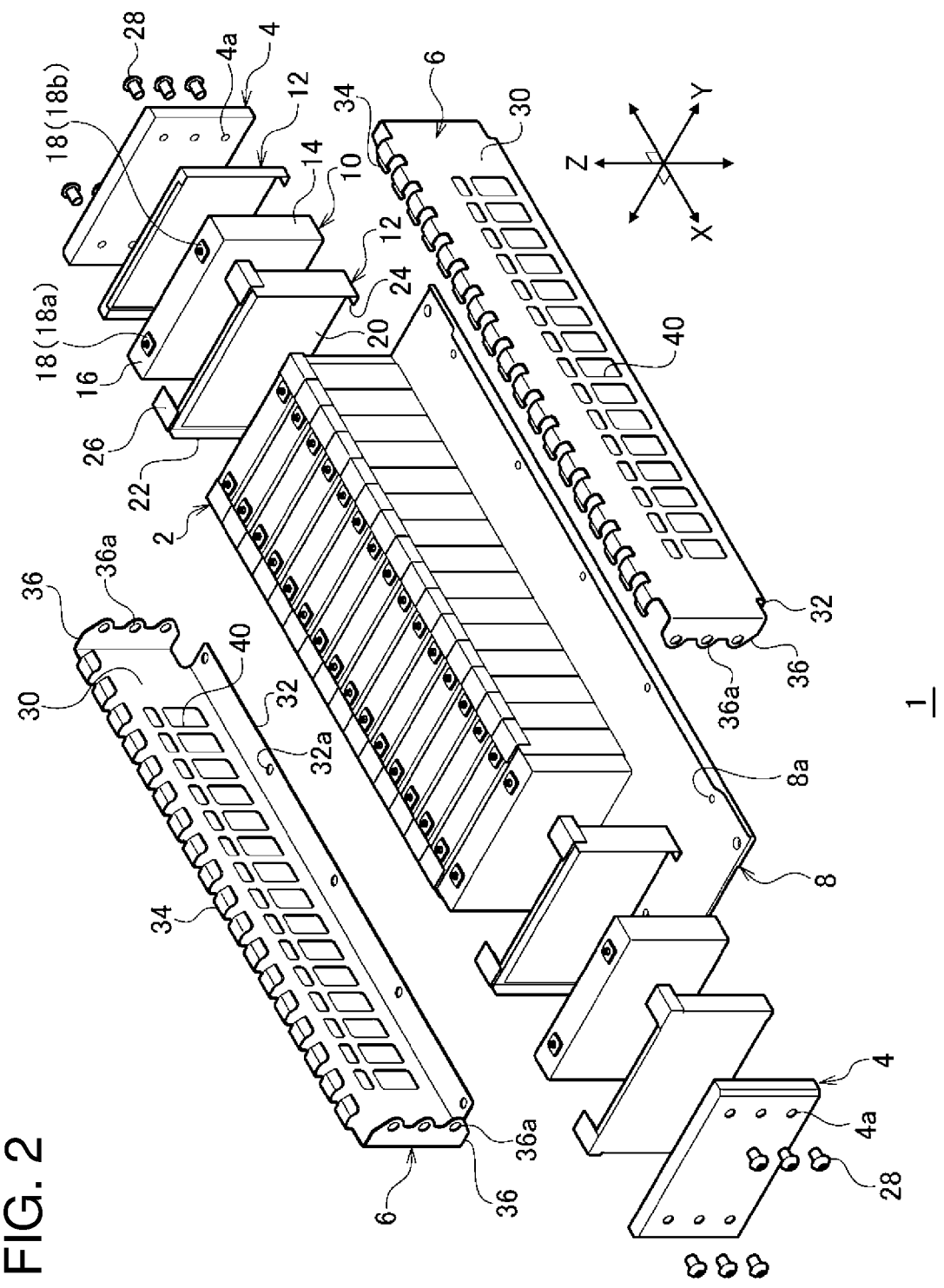
FIG. 2 is an exploded perspective view of the battery module.

FIG. 1 is a perspective view illustrating a schematic structure of a battery module according to an exemplary embodiment. FIG. 2 is an exploded perspective view of the battery module. Battery module 1 includes, as a main configuration, battery stack 2, a pair of binding members 6 (GA), and cooling plate 8.

Battery stack 2 includes a plurality of batteries 10 stacked, a plurality of separators 12, and a pair of end plates 4. Battery 10 is a rechargeable secondary battery such as a lithium ion battery, a nickel metal hydride battery, or a nickel-cadmium battery. Battery 10 is a so-called prismatic (rectangular) battery, and has exterior can 14 having a flat rectangular-parallelepiped shape. An opening that is substantially rectangular is formed on a surface of exterior can 14. An electrode assembly, electrolyte, and the like are housed in exterior can 14 through the opening. Exterior can 14 is covered with an insulating film not shown such as a shrink tube. Covering a surface of exterior can 14 with the insulating film enables to suppress each of short circuit between neighboring batteries 10, short circuit between battery 10 and end plate 4, and short circuit between binding member 6 and cooling plate 8. Sealing plate 16 for sealing exterior can 14 is provided on the opening of exterior can 14.

On sealing plate 16, output terminal 18 as a positive electrode is provided near one end in a longitudinal direction, and output terminal 18 as a negative electrode is provided near the other end in the longitudinal direction. Hereinafter, output terminal 18 as a positive electrode is referred to as positive-electrode terminal 18a, and output terminal 18 as a negative electrode is referred to as negative-electrode terminal 18b as appropriate. When there is no need to distinguish polarities of output terminals 18, positive-electrode terminal 18a and negative-electrode terminal 18b are collectively referred to as output terminal 18. On sealing plate 16, a safety valve (not shown) is provided between the pair of output terminals 18. The safety valve is configured to be capable of opening to release internal gas when an internal pressure of exterior can 14 is increased to a predetermined value or more. Exterior can 14, sealing plate 16, and output terminals 18 are electric conductors and are made of metal, for example.

In the exemplary embodiment, a surface of battery 10 on a side where sealing plate 16 is provided is assumed as an upper surface of battery 10, and a surface of battery 10 on a side opposite to the upper surface is assumed as a bottom surface of battery 10. Further, battery 10 has two main surfaces connecting the upper surface and the bottom surface to each other. The main surfaces have the largest area among six surfaces of battery 10. Two remaining surfaces excluding the upper surface, the bottom surface, and the two main surfaces are assumed as side surfaces of battery 10. An upper surface side of battery 10 is assumed as an upper surface of battery stack 2, and a bottom surface side of battery 10 is assumed as a bottom surface of battery stack 2. For the sake of convenience, an upper surface side of battery stack 2 is assumed as a vertically upward direction, and a bottom surface side of battery stack 2 is assumed as a vertically downward direction.

The plurality of batteries 10 are stacked such that the main surfaces of neighboring batteries 10 face to each other. Note that "stack" means alignment of a plurality of members in any one direction. Therefore, stacking of batteries 10 also includes alignment of the plurality of batteries 10 in a horizontal direction. Further, each battery 10 is disposed such that output terminals 18 are oriented in the same direction (for the sake of convenience herein, vertically upward direction). Two neighboring batteries 10 are stacked such that positive-electrode terminal 18a of one battery 10 and negative-electrode terminal 18b of the other battery 10 are adjacent to each other. Positive-electrode terminal 18a and negative-electrode terminal 18b are electrically connected to each other via a bus bar (not shown). Output terminals 18 of the same polarity of two neighboring batteries 10 may be connected to each other via the bus bar.

Separator 12 is also called an insulating spacer, and is made of resin having an insulation property, for example. Examples of the resin forming separator 12 include thermoplastic resins such as a polypropylene (PP), a polybutylene terephthalate (PBT), a polycarbonate (PC), Noryl (registered trademark) resin (modified PPE), and the like. The plurality of batteries 10 and the plurality of separators 12 are stacked respectively alternately. Separator 12 has flat surface portion 20 parallel to the main surfaces of battery 10, and wall portion 22 extending from an end of flat surface portion 20 in stacking direction X of batteries 10 (a direction indicated by arrow X in each drawing).

Flat surface portion 20 is extended between opposed main surfaces of two adjacent batteries 10. With such a configuration, exterior cans 14 of neighboring batteries 10 are insulated from each other more surely. Flat surface portion 20 is also extended between battery 10 and end plate 4. This arrangement insulates more surely between exterior can 14 of battery 10, and end plate 4. Also, a portion of the upper surface of battery 10, the side surfaces, and a portion of the bottom surface of battery 10 are covered with wall portion 22. This configuration enables to suppress short circuit between neighboring batteries 10 that can be caused by, for example, condensation on a surface of battery 10 or end plate 4. This arrangement also insulates more surely between exterior can 14 of battery 10, and binding member 6.

Wall portion 22 includes cutout 24 to expose the bottom surface of battery 10. Providing cutout 24 enables to prevent thermal connection between battery 10 and cooling plate 8 from being blocked by separator 12.

Separator 12 also includes pressing receiving part 26 oriented toward an upper direction in vertical direction Z (direction indicated by arrow Z in the drawings) perpendicular to stacking direction X and horizontal direction Y (direction indicated by arrow Y in the drawings) at both ends of battery 10 in horizontal direction Y perpendicular to stacking direction X.

The plurality of batteries 10 and the plurality of separators 12, which are stacked, are sandwiched by the pair of end plates 4. The pair of end plates 4 is arranged at both ends of battery stack 2 in stacking direction X of batteries 10. End plate 4 is made of a metal sheet, for example. A main surface of end plate 4 is provided with screw hole 4a. Fastening screw 28 is screwed into screw hole 4a.

The pair of binding members 6 is also called a bind bar and a member for binding battery stack 2. The pair of binding members 6 is arranged in horizontal direction Y, and battery stack 2 is disposed between the pair of binding members 6. Binding member 6 includes body part 30, supporting part 32, a plurality of pressing parts 34, and a pair of fixing parts 36.

Body part 30 is a rectangular plate-shaped body extending in stacking direction X of battery 10. Body part 30 extends in parallel to the side surface of each battery 10. Body part 30 also includes vulnerable parts 40. Vulnerable part 40 has a strength lower than a strength of other part of body part 30. In the exemplary embodiment, vulnerable part 40 is formed by a wall removal part penetrating body part 30 in a first direction. To be more specific, the plurality of vulnerable parts 40 are formed by a plurality of though holes penetrating body part 30 in horizontal direction Y. Providing vulnerable part 40 enables to reduce weight of binding member 6.

Supporting part 32 extends in stacking direction X and projects from body part 30 in the first direction in which battery stack 2 and binding members 6 are aligned. In the exemplary embodiment, supporting part 32 projects in horizontal direction Y from a lower end of body part 30. Supporting part 32 is a plate-shaped body continuous in stacking direction X, and supports battery stack 2 in a state where binding members 6 are assembled to battery stack 2.

The plurality of pressing parts 34 are arranged to have a predetermined interval with respect to supporting part 32 in a second direction perpendicular to stacking direction X and the first direction. The plurality of pressing parts 34 project in the first direction from body part 30. In the present exemplary embodiment, the plurality of pressing parts 34 are connected to an upper end of respective body parts 30. That is, the plurality of pressing parts 34 are arranged to have an interval with respect to supporting part 32 in vertical direction Z. Supporting part 32 and pressing part 34 are opposed to each other in vertical direction Z. Pressing part 34 projects in horizontal direction Y from the upper end of body part 30. Also, the plurality of pressing parts 34 are arranged at predetermined intervals in stacking direction X. Pressing parts 34 are disposed to correspond to respective batteries 10. Each pressing part 34 has a plate spring shape, and presses battery stack 2 and eventually presses battery 10 toward supporting part 32. A length of each pressing part 34 in stacking direction X is shorter than a length of supporting part 32 in stacking direction X.

The pair of fixing parts 36 is a plate-shaped body projecting in horizontal direction Y from both ends of body part 30 in stacking direction X. "End" includes not only an outermost side portion in stacking direction X but also a neighborhood of the outermost side portion. The pair of fixing parts 36 is opposed to each other in stacking direction X. Each fixing part 36 is provided with through hole 36*a* through which fastening screw 28 is inserted. The pair of fixing parts 36 fixes binding member 6 to battery stack 2.

For example, binding member 6 can be formed by preparing a metal sheet having a predetermined shape having projections that become supporting part 32, a plurality of pressing parts 34, and a pair of fixing parts 36 in respective sides of the metal sheet having a rectangular shape having vulnerable parts 40, and subjecting each side of the metal sheet to bending processing.

Cooling plate 8 is a mechanism for cooling the plurality of batteries 10. Cooling plate 8 is formed of a material having heat transfer property such as a metal. Battery stack 2 is placed on a main surface of cooling plate 8. Battery stack 2 is fixed on cooling plate 8 by inserting a fastening member (not shown) such as a screw through through hole 32*a* of supporting part 32 and through hole 8*a* of cooling plate 8. Accordingly, cooling plate 8 also functions as a mounting table of battery stack 2. Each battery 10 is cooled by heat exchange between battery 10 and cooling plate 8. Cooling plate 8 may be provided with a refrigerant pipe (not shown) in which refrigerant flows.

Battery module 1 is assembled as follows, for example. That is, first, the plurality of batteries 10 and the plurality of separators 12 are respectively alternatively arranged and sandwiched by the pair of end plates 4 to form battery stack 2. The pair of binding members 6 is attached to battery stack 2. A portion of battery stack 2 is entered in a space surrounded by supporting part 32, the plurality of pressing parts 34, and the pair of fixing parts 36 in each binding member 6. Also, each binding member 6 is positioned such that through hole 36*a* is overlapped with screw hole 4*a* of end plate 4. In this state, fastening screw 28 is inserted through through hole 36*a* and screwed into screw hole 4*a*. This makes battery stack 2 fastened by the pair of binding members 6.

In the state where binding members 6 are assembled to battery stack 2, the plurality of batteries 10 are sandwiched by the pair of fixing parts 36 to be fastened in stacking direction X. This positions each battery 10 in stacking direction X. Also, battery stack 2 comes into contact with supporting part 32 at the bottom surface of battery stack 2. Accordingly, each battery 10 is supported by supporting part 32 at the bottom surface of each battery 10. Wall portion 22 of separator 12 is interposed between the bottom surface of battery 10 and supporting part 32. Also, battery stack 2 comes into contact with the plurality of pressing parts 34 at the upper surface of battery stack 2. Each pressing part 34 comes into contact with pressing receiving part 26 of each separator 12. Each pressing part 34 presses each battery 10 toward supporting part 32 via pressing receiving part 26. That is, battery stack 2 is sandwiched in vertical direction Z by supporting part 32 and the plurality of pressing parts 34. This positions each battery 10 in vertical direction Z.

In this state, the bus bar is electrically connected to output terminal 18 of each battery 10. Thereafter, a cover member (not shown) is attached on the upper surface of battery stack 2. The cover member is also called a top cover, and prevents condensation water, dust, and the like from touching output terminal 18 of batteries 10, the bus bar, a valve, or the like. The cover member can be fixed on the upper surface of battery stack 2 by a known fixing structure (not shown) including a screw and a known locking mechanism. Battery stack 2 to which binding members 6 and the cover member are attached is placed on cooling plate 8, and fixed to cooling plate 8 by inserting the fastening member through through hole 8*a* and through hole 32*a*. The above-mentioned steps enable to yield battery module 1. Note that battery module 1 may be manufactured by integrally fixing battery stack 2 and cooling plate 8 by binding members 6 after battery stack 2 is installed on cooling plate 8. In this case, cooling plate 8 is disposed inside the pair of binding members 6.

Binding member 6 includes supporting part 32 on one side in vertical direction Z, and a plurality of pressing parts 34 on the other side in vertical direction Z. Supporting part 32 is a continuous structure in stacking direction X, and each pressing part 34 is a small piece separated from each other. The inventor of the present invention has intensively studied and found that deviation of rigidity occurs in binding member 6 having such a structure. That is, binding member 6 tends to be small in rigidity in a region on a side where pressing parts 34 are provided as compared with a region on a side where supporting part 32 is provided. Further, in the present exemplary embodiment, the side on supporting part 32 of binding member 6 is fixed to cooling plate 8. This makes rigidity on the side of pressing part 34 further smaller than rigidity on the side of supporting part 32.

Deviation of rigidity of binding member 6 makes it difficult to evenly binding each battery 10, thus making it difficult to stably hold battery stack 2. Also, deviation of rigidity of binding member 6 may cause to concentrate stress occurred in binding member 6 due to expansion of battery 10 or the like on one portion. Specifically, expansion of battery 10 causes to largely deform battery stack 2 on the side of pressing part 34 lower in rigidity as compared with the side of supporting part 32 higher in rigidity. Accordingly, end plate 4 is largely displaced toward outer side in stacking direction X on the side of pressing part 34 as compared with the side of supporting part 32. This concentrates stress on the side of supporting part 32 of binding member 6.

Figure 3:
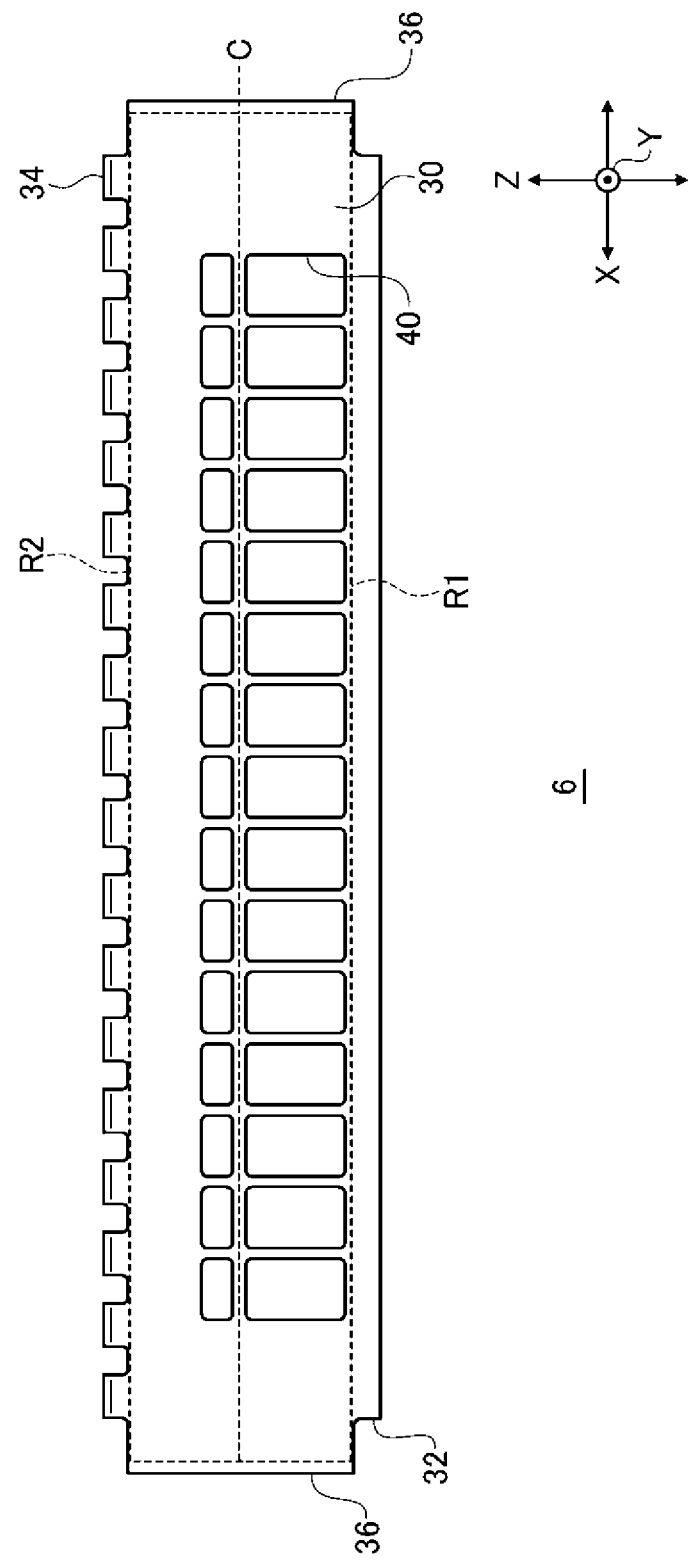
FIG. 3 is a front view illustrating a schematic structure of a binding member according to the exemplary embodiment.

In contrast, binding member 6 according to the present exemplary embodiment has a structure described below to eliminate imbalance of rigidity of binding member 6. FIG. 3 is a front view illustrating a schematic structure of the binding member according to the exemplary embodiment. As illustrated in FIG. 3, in binding member 6 according to the present exemplary embodiment, vulnerable parts 40 are unevenly distributed on the side of supporting part 32. Specifically, when body part 30 is divided into two parts (equally) in vertical direction Z (second direction) that are supporting part side region R1 and pressing part side region R2, a total area of vulnerable parts 40 in supporting part side region R1 is larger than a total area of vulnerable parts 40 in pressing part side region R2 when viewed from horizontal direction Y (first direction).

In the present exemplary embodiment, in supporting part side region R1, vulnerable parts 40 each having a substantially rectangular shape long in vertical direction Z are arranged at predetermined intervals in stacking direction X. Vulnerable parts 40 arranged in supporting part side region R1 are extended in substantially an entire region of supporting part side region R1 in vertical direction Z. Also, in pressing part side region R2, vulnerable parts 40 which have a substantially rectangular shape, have a length equal to a length of vulnerable parts 40 arranged in supporting part side region R1 in stacking direction X, and have a length in vertical direction Z shorter than the length in stacking direction X are arranged at predetermined intervals in stacking direction X. Vulnerable parts 40 arranged in pressing part side region R2 are arranged to close to center C of body part 30 in vertical direction Z. Note that the shape, the number, and arrangement of vulnerable parts 40 are not particularly limited as long as the total area in supporting part side region R1 is larger than the total area in pressing part side region R2. For example, vulnerable part 40 need not be provided in pressing part side region R2.

Supporting part side region R1 is a region from center C of body part 30 to a connection position with supporting part 32, and pressing part side region R2 is a region from center C to a connection position with pressing part 34. Note that, when the total areas of vulnerable parts 40 are compared, when projection lengths of supporting part 32 and pressing part 34 from body part 30 in vertical direction Z are equal, supporting part side region R1 may be a region on the side of supporting part 32 when the whole of binding member 6 is divided into two regions in vertical direction Z. That is, supporting part 32 may be included in supporting part side region R1. Also, pressing part side region R2 may be a region on the side of pressing part 34 when the whole of binding member 6 is divided into two regions in vertical direction Z. That is, pressing part 34 may be included in pressing part side region R2.

Vulnerable part 40 acts to lower rigidity of binding member 6. Accordingly, unevenly distributing vulnerable parts 40 in supporting part side region R1 makes it possible to decrease rigidity in supporting part side region R1 and relatively increase rigidity in pressing part side region R2. Accordingly, rigidity in supporting part side region R1 is smaller than rigidity in pressing part side region R2 in body part 30.

As described above, binding member 6 according to the present exemplary embodiment includes body part 30 extending in stacking direction X of batteries 10, supporting part 32 extending in stacking direction X and projecting from body part 30 to support battery stack 2, and the plurality of pressing parts 34 arranged to have a predetermined interval with respect to supporting part 32. The plurality of pressing parts 34 are arranged in stacking direction X and project from body part 30 to press battery stack 2 toward supporting part 32. When body part 30 is divided into two regions that are supporting part side region R1 and pressing part side region R2, rigidity in supporting part side region R1 is smaller than rigidity in pressing part side region R2.

Binding member 6 tends to have high rigidity on the side where supporting part 32 that is continuous is arranged and low rigidity on the side where the plurality of pressing parts 34 that are small pieces are arranged. In contrast, body part 30 according to the present exemplary embodiment has deviation in rigidity, and rigidity in supporting part side region R1 is smaller than rigidity in pressing part side region R2. Accordingly, action to rigidity by supporting part 32 and pressing parts 34 and deviation of rigidity in body part 30 are combined to make deviation of rigidity of the whole of binding member 6 small.

Eliminating deviation of rigidity of binding member 6 increases evenness in holding each battery 10, making it possible to stably hold battery stack 2. Also, making rigidity of binding member 6 even makes it possible to evenly deform battery stack 2 when battery 10 is expanded. This enables to reduce concentration of stress occurred in binding member 6. The above-mentioned structure enables to increase stability of battery module 1.

Body part 30 according to the present exemplary embodiment also includes vulnerable parts 40. When body part 30 is divided into two regions that are supporting part side region R1 and pressing part side region R2, the total area of vulnerable parts 40 in supporting part side region R1 is larger than the total area of vulnerable parts 40 in pressing part side region R2. Unevenly distributing vulnerable parts 40 in this manner makes it possible to decrease rigidity of binding member 6 in supporting part side region R1 and increase rigidity of binding member 6 in pressing part side region R2. Accordingly, action to rigidity by supporting part 32 and pressing parts 34 and action to rigidity by vulnerable parts 40 enable to make deviation of rigidity of the whole of binding member 6 small.

Also, vulnerable parts 40 are unevenly distributed on the side of cooling plate 8. That is, a remaining part of body part 30 in pressing part side region R2 is larger than a remaining part of body part 30 in supporting part side region R1. This enables to increase heat capacity of pressing part side region R2. Cooling efficiency of a portion of battery 10 becomes lower as the portion of battery 10 is away from cooling plate 8. In contrast, increase of heat capacity in pressing part side region R2 away from cooling plate 8 as compared with supporting part side region R1 makes it possible to equalize cooling efficiency of battery 10.

Vulnerable part 40 according to the present exemplary embodiment is formed of a wall removal part penetrating body part 30. This enables to equalize rigidity of binding member 6 with a simple structure.

The present invention is not limited to the above-mentioned exemplary embodiment, and modifications such as various design changes can be added based on knowledge of the person of ordinary skill in the art. The modified exemplary embodiments are also included in the scope of the present invention. New exemplary embodiments made by adding modifications to the above-mentioned exemplary embodiment also have respective effects of the combined exemplary embodiments and the modified exemplary embodiments.

Figure 4:
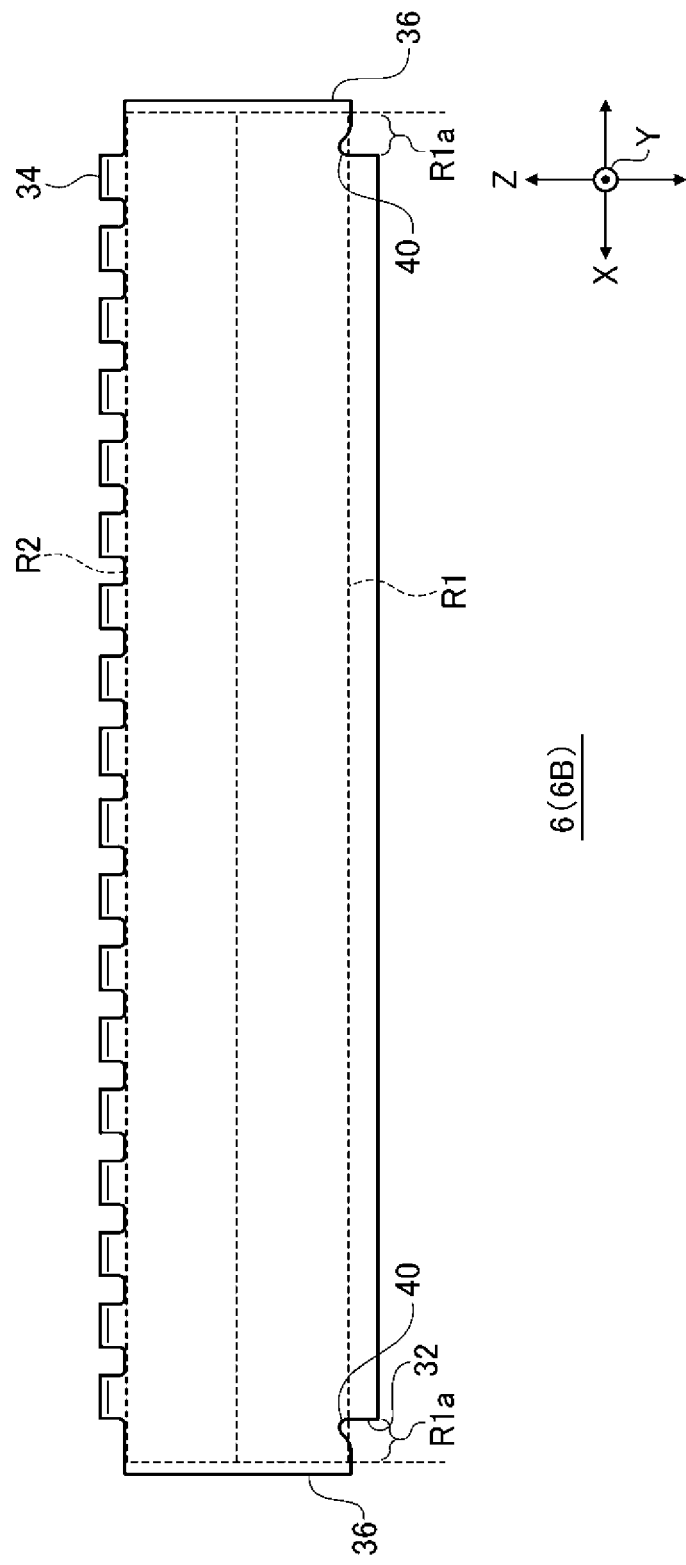
FIG. 4 is a perspective view illustrating a schematic structure of a binding member according to a modified example.

FIG. 4 is a perspective view illustrating a schematic structure of a binding member according to a modified example. Binding member 6 (6B) according to the present modified example is the same as the structure of binding member 6 according to a first exemplary embodiment besides a point of having characteristics in arrangement and structure of vulnerable parts 40. Specifically, supporting part 32 extends in a region excluding end regions R1a of body part 30 in stacking direction X. End region R1a is a region overlapping with end plate 4, for example. Vulnerable part 40 is disposed in end region R1a where supporting part 32 is not extended in stacking direction X among supporting part side region R1.

Arrangement of vulnerable part 40 in supporting part side region R1 and end region R1a makes it possible to more surely deform supporting part side region R1 with respect to expansion of battery 10. This enables to further reduce concentration of stress occurred in binding member 6.

Vulnerable part 40 arranged in end region R1a is formed by a cutout opened on the side of supporting part 32 in vertical direction Z (second direction). This enables to more surely reduce concentration of stress occurred in binding member 6. Note that vulnerable part 40 arranged in end region R1a may be formed by a through hole whose outer circumference is closed as in the exemplary embodiment. Vulnerable parts 40 having the arrangement described in the exemplary embodiment and vulnerable parts 40 having the arrangement described in the present modified example may be combined. That is, the invention of the present application includes the structure in which at least some of vulnerable parts 40 are arranged in end region R1*a*.

(Others)

In the above-mentioned exemplary embodiment and modified example, cooling plate 8 may be omitted. For example, a pedestal that is not expected to provide cooling effect may be used instead of cooling plate 8. Also, fixation between binding member 6 and end plate 4 is not limited to bolt fastening. For example, a structure to engage binding member 6 and end plate 4 with each other may be provided for engagement, or both may be fixed by welding. In a case where fixing structure by engagement is employed, binding members 6 are fixed to end plate 4 near ends slightly close to center from respective both ends in stacking direction X. Also, short circuit between exterior can 14 of battery 10 and another member such as binding member 6 may be suppressed using an insulating member other than separator 12.

In the above-described exemplary embodiment and modified example, battery 10 is a prismatic battery. However, a shape of battery 10 is not particularly limited and may be cylindrical, for example. Also, a number of batteries 10 included in battery stack 2 is not particularly limited. Also, vulnerable part 40 may be a thin wall thinner than another part in body part 30, or a part formed of a material having low rigidity than rigidity of the other part.

Any combinations of the above-described configuration elements, and converted expressions of the present invention in method, apparatus, system, and the like are also effective as aspects of the present invention.

The invention claimed is:

1. A binding member for binding a battery stack including a plurality of batteries stacked, the binding member comprising:
   a body part extending in a stacking direction of the batteries;
   a supporting part extending in the stacking direction and projecting from the body part in a first direction in which the battery stack and the binding member are aligned, the supporting part supporting the battery stack; and
   a plurality of pressing parts arranged to have a predetermined interval from the supporting part in a second direction perpendicular to the stacking direction and the first direction, the plurality of pressing parts being arranged in the stacking direction and projected in the first direction from the body part to press the battery stack toward the supporting part, wherein
   when the body part is divided into two regions in the second direction that are a supporting part side region and a pressing part side region, a rigidity in the supporting part side region is smaller than a rigidity in the pressing part side region.

2. The binding member according to claim 1, wherein
   the body part includes vulnerable parts having a strength lower than a strength of another part, and
   a total area of the vulnerable parts in the supporting part side region is larger than a total area of the vulnerable parts in the pressing part side region when viewed from the first direction.

3. The binding member according to claim 2, wherein
   the supporting part extends in a region excluding an end region of the body part in the stacking direction, and
   at least some of the vulnerable parts are arranged in the end region among the supporting part side region.

4. The binding member according to claim 2, wherein
   the vulnerable parts are formed of wall removal parts penetrating the body part in the first direction.

5. The binding member according to claim 3, wherein
   the vulnerable parts arranged in the end region are formed of a cutout opened on a side of the supporting part in the second direction.

6. A battery module comprising:
   a battery stack including a plurality of batteries stacked; and
   the binding member according to claim 1.

* * * * *